United States Patent

Nakatsugawa

[11] Patent Number: 6,167,454
[45] Date of Patent: *Dec. 26, 2000

[54] ADDRESS SETTING METHOD AND COMMUNICATION SYSTEM EMPLOYING THE ADDRESS SETTING METHOD IN A MULTIPLE RING NETWORK UTILIZING VARIABLY SET ADDRESSES AND ADDRESS WRITE ENABLE/DISABLE STATES

[75] Inventor: Yoshinori Nakatsugawa, Shizuoka, Japan

[73] Assignee: Yazaki Corporation, Tokyo, Japan

[*] Notice: This patent is subject to a terminal disclaimer.

[21] Appl. No.: 09/105,173

[22] Filed: Jun. 26, 1998

[30] Foreign Application Priority Data

Jun. 26, 1997 [JP] Japan ..................... 9-170608

[51] Int. Cl.[7] .................. G06F 15/16; G06F 15/177; H04J 3/24
[52] U.S. Cl. .................. 709/245; 709/220; 709/249; 709/250; 709/251; 370/475
[58] Field of Search .................. 709/220, 245, 709/249, 250, 251; 370/475

[56] References Cited

U.S. PATENT DOCUMENTS

| | | | |
|---|---|---|---|
| 5,204,858 | 4/1993 | Kinashi et al. | 370/400 |
| 5,287,343 | 2/1994 | Nakamura et al. | 370/243 |
| 5,477,547 | 12/1995 | Sugiyama | 370/401 |
| 5,623,496 | 4/1997 | Sagi | 370/475 |
| 5,781,550 | 7/1998 | Templin et al. | 370/401 |
| 5,781,552 | 7/1998 | Hashimoto | 370/447 |
| 5,815,668 | 9/1998 | Hashimoto | 709/238 |

FOREIGN PATENT DOCUMENTS

| | | |
|---|---|---|
| 2 641 629 | 7/1990 | European Pat. Off. . |
| 0 436 932 | 7/1991 | European Pat. Off. . |
| 59-62245 | 4/1984 | Japan . |
| 63-283252 | 11/1988 | Japan . |
| 3-72740 | 3/1991 | Japan . |
| 4-326896 | 11/1992 | Japan . |

OTHER PUBLICATIONS

W.M. Louks, et al., Computer Networks and ISDN Systems, No. 11, pp. 133–146,"Implementation of a Dynamic Address Assignment Protocol in a Local Area Network", Feb. 11, 1996.

*Primary Examiner*—Le Hien Luu
*Assistant Examiner*—Paul Kang
*Attorney, Agent, or Firm*—Oblon, Spivak, McClelland, Maier & Neustadt, P.C.

[57] ABSTRACT

Communication stations whose own addresses coincide with a destination address of communication data received via data transmission lines and whose write enable/disable states of their own addresses stored in their address/flag memory are in their write enable states can update their own addresses to variably set address values of the communication data, then update their own address write enable/disable states to their write disable states, then execute predetermined calculations for the variably set address value in the communication data, and then transmit the communication data whose variably set address value has been rewritten into the variably set address value obtained by the calculations to succeeding stations so as to circulate between a plurality of communication stations sequentially.

11 Claims, 4 Drawing Sheets

K: VARIABLY SET ADDRESS
A: SET NUMBER ACCUMULATED VALUE

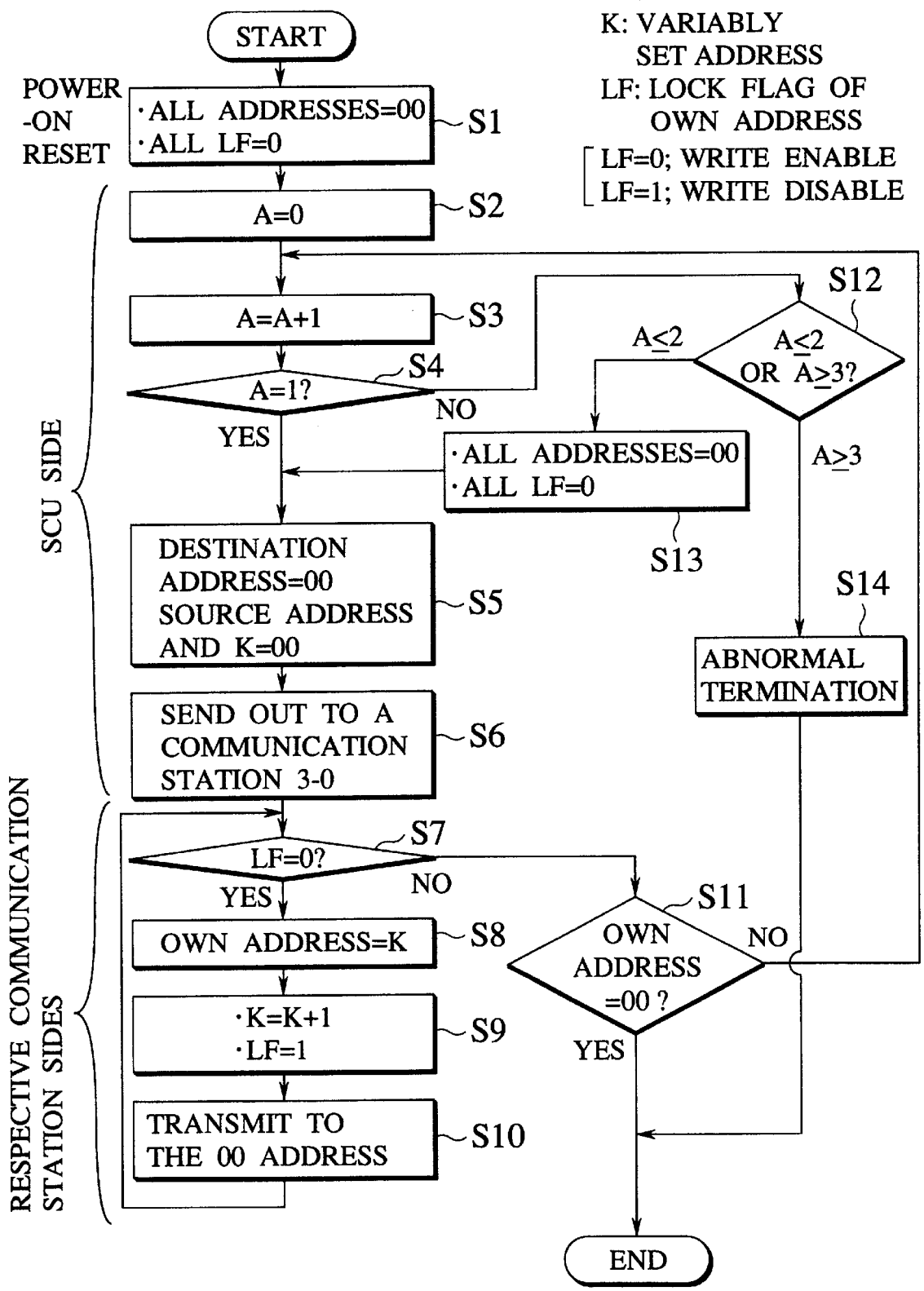

ADDRESS SETTING METHOD AND COMMUNICATION SYSTEM EMPLOYING THE ADDRESS SETTING METHOD IN A MULTIPLE RING NETWORK UTILIZING VARIABLY SET ADDRESSES AND ADDRESS WRITE ENABLE/DISABLE STATES

BACKGROUND OF THE INVENTION

1. Field of the Invention

The present invention relates to an address setting method for use in a communication system, which is constructed by connecting a plurality of communication stations mutually via data transmission lines in a data exchangeable manner, and capable of allocating/setting own addresses to enable mutual discrimination of their identity. More particularly, the present invention relates to an address setting method capable of setting their own addresses to a plurality of communication stations by simple process procedures respectively and also capable of improving throughput as a whole communication system upon setting the address, and a communication system to which the address setting method is applied.

2. Description of the Prior Art

In the prior art, there has been commonly known a communication system which is constructed by connecting a plurality of communication stations mutually via data transmission lines in a data exchangeable manner.

In the above communication system in the prior art, upon carrying out data exchange between the communication stations mutually, addresses to enable mutual discrimination of their own identity must be allocated and set previously to the communication stations respectively.

Therefore, in the prior art, as disclosed in Patent Application Publication (KOKAI) Hei 4-326896, for example, there has been publicly known an address setting method for use in a communication system in which at least one master apparatus and a plurality of slave apparatuses are connected to a common communication bus.

In the communication system disclosed in the above Publication, each of the slave apparatuses comprises a storing means for storing its own communication address updatably and a connection requesting means for transmitting its own connection request information to the master apparatus upon starting the communication system, while the master apparatus comprises a communication address setting means for setting the communication address of the slave apparatus in such a way that such set communication address can be discriminated from those in other slave units and for informing the concerned slave apparatus of such set communication address when it receives the connection requesting information.

According to the communication system, the connection requesting means of the slave apparatus transmits its own connection request information to the master apparatus upon starting the communication system, while the communication address setting means of the master apparatus sets the communication address of the slave apparatus in such a way that such set communication address can be discriminated from those in other slave units and then informs the concerned slave apparatus of such set communication address when it receives the connection requesting information. Therefore, even though a plurality of slave apparatuses are connected on the same communication bus, the address to enable mutual discrimination of their identity can be set without fail to each slave apparatus.

However, according to the address setting method in the above communication system in the prior art, the master apparatus, when receiving the connection requesting information from respective slave apparatuses, has allocated/set the communication address to/in the slave apparatus in such a way that such set communication address can be discriminated from those in other slave units and then returned/informed the set communication address to/of the concerned slave apparatus individually. Therefore, the address setting method in the prior art has contained such a problem to be overcome that process procedures for exchanging the data including the connection requesting information, the communication address, etc. between the master apparatus and the plurality of slave apparatuses individually are complicated.

Furthermore, a total sum of time consumed to carry out the data exchange individually, i.e., a time requested for address setting has tended to become longer. As a result, the address setting method in the prior art has also another problem to be overcome that it is difficult to improve throughput as a whole communication system upon setting addresses.

SUMMARY OF THE INVENTION

The present invention has been made in light of the above circumstances, and it is an object of the present invention to provide an address setting method which is capable of setting their own addresses to a plurality of communication stations by simple process procedures respectively and also capable of improving throughput as a whole communication system upon setting the address, and a communication system to which the address setting method is applied.

In order to achieve the above object, there is provided an address setting method which is used in a communication system constructed by connecting a plurality of communication stations mutually via data transmission lines in a data exchangeable manner and allocates/sets their own addresses by circulating sequentially communication data between the plurality of communication stations so as to enable mutual discrimination of their identity, wherein when own address allocating/setting process for each of the plurality of communication stations constituting the communication system is started, the plurality of communication stations initialize their own addresses stored in their own address storing means provided in the plurality of communication stations respectively to a predetermined value which is common to the plurality of communication stations, and also initialize their own address write enable/disable states stored in their state storing means provided in the plurality of communication stations respectively to their write enable states, and any one of the plurality of communication stations transmits the communication data, in which a predetermined value, which is common to the plurality of communication stations, is described in their destination address portions, in which a destination address of the communication station as a destination of the communication data is described, and also in which a variably set address as any initial value is described in a variably set address description area in which the variably set address to be allocated/set to the plurality of communication stations respectively is described, to one communication station of the plurality of communication stations, and when their own addresses coincide with the destination address of the communication data received via the data transmission line and their write enable/disable states of their own addresses stored in the state storing means are in their write enable states, the plurality of communication stations including the any one of the plurality of communication stations update their own addresses stored in the own address storing means to the variably set address value described in the variably set address description area of the communication data, then update their own address write enable/disable states to their write disable states, then execute predetermined calculations for the variably set address value described in the variably set address description area of the communication data, then describe the variably set address value calculated by the calculations in the variably set address description area of the communication data, and then transmit the communication data whose variably set address value has been rewritten to succeeding stations.

According to the present invention, at first the plurality of communication stations initialize their own addresses stored in their own address storing means provided in the plurality of communication stations respectively to a predetermined value which is common to the plurality of communication stations, and also initialize their own address write enable/disable states stored in their state storing means provided in the plurality of communication stations respectively to their write enable states, when own address allocating/setting process for each of the plurality of communication stations constituting the communication system is started. Then, any one of the plurality of communication stations transmits the communication data, in which a predetermined value which is common to the plurality of communication stations is described in their destination address portions, in which a destination address of the communication station as a destination of the communication data is described, and also in which a variably set address as any initial value is described in a variably set address description area in which the variably set address to be allocated/set to the plurality of communication stations respectively is described, to one communication station of the plurality of communication stations. Then, the plurality of communication stations including the any one of the plurality of communication stations update their own addresses stored in the own address storing means to the variably set address value described in the variably set address description area of the communication data and also update their own address write enable/disable states to their write disable states when their own addresses coincide with the destination address of the communication data received via the data transmission line and their write enable/disable states of their own addresses stored in the state storing means are in their write enable states, then execute predetermined calculations for the variably set address value described in the variably set address description area of the communication data, then describe the variably set address value calculated by the calculations in the variably set address description area of the communication data, and then transmit the communication data whose variably set address value has been rewritten to succeeding stations.

Like the above, according to the present invention, the communication station whose own address coincides with the destination address of the communication data received via the data transmission line and whose write enable/disable state of own address stored in a state storing means is in its write enable state can update its own address to the variably set address value described in the variably set address description area of the communication data, then update its write enable/disable state of its own address to the write disable state, then executes predetermined calculations for the variably set address value described in the variably set address description area of the communication data, then describes the variably set address value calculated by this calculation in the variably set address description area of the communication data, and then transmits the communication data whose variably set address value has been rewritten to the next station so as to circulate between the plurality of communication stations sequentially. Therefore, their own addresses can be set to a plurality of communication stations by simple process procedures respectively and also throughput as a whole communication system upon setting the address can be improved.

In order to achieve the above object, there is provided an address setting method which is used in a communication system constructed by connecting a plurality of communication stations mutually via data transmission lines in a data exchangeable manner and allocates/sets their own addresses by circulating sequentially communication data between the plurality of communication stations so as to enable mutual discrimination of their identity, wherein when own address allocating/setting process for each of the plurality of communication stations constituting the communication system is started, the plurality of communication stations initialize their own addresses stored in their own address storing means provided in the plurality of communication stations respectively to a predetermined value which is common to the plurality of communication stations, and also initialize their own address write enable/disable states stored in their state storing means provided in the plurality of communication stations respectively to their write enable states, and a system control means, which is connected to any one communication station of the plurality of communication stations and manages integratedly their own address allocating/setting processes of the plurality of communication stations respectively, transmits the communication data, in which a predetermined value, which is common to the plurality of communication stations, is described in their destination address portions, in which a destination address of the communication station as a destination of the communication data is described, and also in which a variably set address as any initial value is described in a variably set address description area in which the variably set address to be allocated/set to the plurality of communication stations respectively is described, to the one communication station, and when their own addresses coincide with the destination address of the communication data received via the data transmission line and their write enable/disable states of their own addresses stored in the state storing means are in their write enable states, the plurality of communication stations including the any one of the plurality of communication stations update their own addresses stored in the own address storing means to the variably set address value described in the variably set address description area of the communication data, then update their own address write enable/disable states to their write disable states, then execute predetermined calculations for the variably set address value described in the variably set address description area of the communication data, then describe the variably set address value calculated by the calculations in the variably set address description area of the communication data, and then transmit the communication data whose variably set address value has been rewritten to succeeding stations.

According to the present invention, at first the plurality of communication stations initialize their own addresses stored in their own address storing means provided in the plurality of communication stations respectively to a predetermined value which is common to the plurality of communication stations, and also initialize their own address write enable/disable states stored in their state storing means provided in the plurality of communication stations respectively to their write enable states, when own address allocating/setting process for each of the plurality of communication stations constituting the communication system is started. Then, a system control means, which is connected to any one communication station of the plurality of communication stations and manages integratedly their own address allocating/setting processes of the plurality of communication stations respectively, transmits the communication data, in which a predetermined value, which is common to the plurality of communication stations, is described in their destination address portions, in which a destination address of the communication station as a destination of the communication data is described, and also in which a variably set address as any initial value is described in a variably set address description area in which the variably set address to be allocated/set to the plurality of communication stations respectively is described, to the one communication station. Then, the plurality of communication stations including the any one of the plurality of communication stations update their own addresses stored in the own address storing means to the variably set address value described in the variably set address description area of the communication data and update their own address write enable/disable states to their write disable states when their own addresses coincide with the destination address of the communication data received via the data transmission line and their write enable/disable states of their own addresses stored in the state storing means are in their write enable states, then execute predetermined calculations for the variably set address value described in the variably set address description area of the communication data, then describe the variably set address value calculated by the calculations in the variably set address description area of the communication data, and then transmit the communication data whose variably set address value has been rewritten to succeeding stations.

In this manner, according to the present invention, like the above invention, their own addresses can be set to a plurality of communication stations by simple process procedures respectively and also throughput as a whole communication system upon setting the address can be improved. In addition to the above, since the system control means which can manage integratedly their own address allocating/setting processes of the plurality of communication stations respectively is provided as a separate body from the communication stations, common configurations of the plurality of communication stations can be adopted. As a result, fabrication cost of the overall communication system can be reduced.

In the preferred embodiment of the present invention, when their own addresses coincide with the destination address of received communication data and their write enable/disable states of their own addresses stored in the state storing means are in their write enable states, the plurality of communication stations including the any one of the plurality of communication stations decide whether or not their own addresses coincide with the source address contained in the communication data, and then when their own addresses and the source address coincide with each other as a result of coincidence decision, the plurality of communication stations including the any one of the plurality of communication stations recognize the effect that the address setting process has been normally completed and also transmit the normally set complete signal including the effect that the address setting process has been normally completed to the system control means.

In the preferred embodiment of the present invention, upon receiving the normally set complete signal, the system control means terminates their own address allocating/setting processes of the plurality of communication stations respectively.

In the preferred embodiment of the present invention, when their own addresses coincide with the destination address of received communication data and their write enable/disable states of their own addresses stored in the state storing means are in their write disable states, the plurality of communication stations including the any one of the plurality of communication stations decide whether or not their own addresses coincide with the source address contained in the communication data, and then when their own addresses and the source address do not coincide with each other as a result of coincidence decision, the plurality of communication stations including the any one of the plurality of communication stations recognize the effect that the address setting failure has been caused and also transmit the set failure generation signal including the effect that the address setting failure has been caused to the system control means.

In the preferred embodiment of the present invention, upon receiving the set failure generation signal, the system control means executes repeatedly their own address allocating/setting processes of the plurality of communication stations respectively.

In the preferred embodiment of the present invention, the system control means executes abnormal termination of their own address allocating/setting processes when the repeatedly execution number of their own address allocating/setting processes reaches to a predetermined value.

In order to achieve the above object, there is provided a communication system which is constructed by connecting a plurality of communication stations mutually via data transmission lines in a data exchangeable manner and to which an address setting method of allocating/setting their own addresses to the plurality of communication stations respectively by circulating sequentially communication data between the plurality of communication stations so as to enable mutual discrimination of their identity, wherein the communication data comprises, a destination address area in which destination addresses of the communication stations as destinations of the communication data are described, and a variably set address description area in which variably set addresses to be allocated/set to the plurality of communication stations respectively are described, and each of the plurality of communication stations comprises, an own address storing means for storing its own address of own communication station, a state storing means for storing its write enable/disable state of its own address stored in the own address storing means, and an initializing means for initializing its own address which is stored in the own address storing means provided in the plurality of communication stations respectively to a predetermined value which is common to the plurality of communication stations, and also initializing its own address write enable/disable state stored in the state storing means provided in the plurality of communication stations respectively to its write enable state, when their own address allocating/setting processes for the plurality of communication stations constituting the communication system respectively are started, and any one communication station of the plurality of communication stations comprises, an initial data transmitting means for transmitting the communication data in which a predetermined value which is common to the plurality of communication stations is described in the destination address portion and also in which a variably set address as any initial value is described in the variably set address description area to one communication station of the plurality of communication stations including its own communication station, and the plurality of communication stations including the any one of the plurality of communication stations comprises, a communication data receiving means for receiving the communication data via the data transmission line, an updating means for updating their own addresses stored in the own address storing means to the variably set address value described in the variably set address description area of the communication data, then updating their own address write enable/disable states stored in the state storing means to their write disable states, when their own addresses coincide with the destination address of the communication data received via the data transmission line and their write enable/disable states of their own addresses stored in the state storing means are in their write enable states, and a communication data transmitting means for executing predetermined calculations for the variably set address value described in the variably set address description area of the communication data, then describing the variably set address value calculated by the calculations in the variably set address description area of the communication data, and then transmitting the communication data whose variably set address value has been rewritten to succeeding stations.

According to the present invention, at first the initializing means initializes its own address which is stored in the own address storing means provided in the plurality of communication stations respectively to a predetermined value which is common to the plurality of communication stations and also initializes its own address write enable/disable state stored in the state storing means provided in the plurality of communication stations respectively to its write enable state when their own address allocating/setting processes for the plurality of communication stations constituting the communication system respectively are started. Then, the initial data transmitting means transmits the communication data in which a predetermined value which is common to the plurality of communication stations is described in the destination address portion, and also in which a variably set address as any initial value is described in the variably set address description area to one communication station of the plurality of communication stations including its own communication station, and the communication data receiving means receives the communication data via the data transmission line. Then, when their own addresses coincide with the destination address of the communication data received via the data transmission line and their write enable/disable states of their own addresses stored in the state storing means are in their write enable states, the updating means updates their own addresses stored in the own address storing means to the variably set address value described in the variably set address description area of the communication data and also updates their own address write enable/disable states stored in the state storing means to their write disable states. Then, the communication data transmitting means executes predetermined calculations for the variably set address value described in the variably set address description area of the communication data, then describes the variably set address value calculated by the calculations in the variably set address description area of the communication data, and then transmits the communication data whose variably set address value has been rewritten to succeeding stations.

In this manner, according to the present invention, the communication station whose own address coincides with the destination address of the communication data received via the data transmission line and whose write enable/disable state of own address stored in a state storing means is in its write enable state can update its own address to the variably set address value described in the variably set address description area of the communication data, then update its write enable/disable state of its own address to the write disable state, then executes predetermined calculations for the variably set address value described in the variably set address description area of the communication data, then describes the variably set address value calculated by this calculation in the variably set address description area of the communication data, and then transmits the communication data whose variably set address value has been rewritten to the next station so as to circulate between the plurality of communication stations sequentially. Therefore, their own addresses can be set to a plurality of communication stations by simple process procedures respectively and also throughput as a whole communication system upon setting the address can be improved.

In order to achieve the above object, there is provided a communication system which is constructed by connecting a plurality of communication stations mutually via data transmission lines in a data exchangeable manner and to which an address setting method of allocating/setting their own addresses to the plurality of communication stations respectively by circulating sequentially communication data between the plurality of communication stations so as to enable mutual discrimination of their identity, wherein the communication data comprises at least, a destination address area in which destination addresses of the communication stations as destinations of the communication data are described, and a variably set address description area in which variably set addresses to be allocated/set to the plurality of communication stations respectively are described, and each of the plurality of communication stations comprises, an own address storing means for storing its own address of own communication station, a state storing means for storing its write enable/disable state of its own address stored in the own address storing means, and an initializing means for initializing its own address which is stored in the own address storing means provided in the plurality of communication stations respectively to a predetermined value which is common to the plurality of communication stations, and also initializing its own address write enable/disable state stored in the state storing means provided in the plurality of communication stations respectively to its write enable state, when their own address allocating/setting processes for the plurality of communication stations constituting the communication system respectively are started, and a system control means which is connected to any one communication station of the plurality of communication stations and manages integratedly their own address allocating/setting processes of the plurality of communication stations respectively comprises, an initial data transmitting means for transmitting the communication data in which a predetermined value which is common to the plurality of communication stations is described in the destination address portion and also in which a variably set address as any initial value is described in the variably set address description area to one communication station of the plurality of communication stations including its own communication station, and the plurality of communication stations including the any one of the plurality of communication stations comprises, a communication data receiving means for receiving the communication data via the data transmission line, an updating means for updating their own addresses stored in the own address storing means to the variably set address value described in the variably set address description area of the communication data, then updating their own address write enable/disable states stored in the state storing means to their write disable states, when their own addresses coincide with the destination address of the communication data received via the data transmission line and their write enable/disable states of their own addresses stored in the state storing means are in their write enable states, and a communication data transmitting means for executing predetermined calculations for the variably set address value described in the variably set address description area of the communication data, then describing the variably set address value calculated by the calculations in the variably set address description area of the communication data, and then transmitting the communication data whose variably set address value has been rewritten to succeeding stations.

According to the present invention, at first the initializing means initializes its own address which is stored in the own address storing means provided in the plurality of communication stations respectively to a predetermined value which is common to the plurality of communication stations and also initializes its own address write enable/disable state stored in the state storing means provided in the plurality of communication stations respectively to its write enable state when their own address allocating/setting processes for the plurality of communication stations constituting the communication system respectively are started. Then, the initial data transmitting means provided in the system control means transmits the communication data in which a predetermined value which is common to the plurality of communication stations is described in the destination address portion, and also in which a variably set address as any initial value is described in the variably set address description area to one communication station of the plurality of communication stations including its own communication station, and the communication data receiving means receives the communication data via the data transmission line. Then, when their own addresses coincide with the destination address of the communication data received via the data transmission line and their write enable/disable states of their own addresses stored in the state storing means are in their write enable states, the updating means updates their own addresses stored in the own address storing means to the variably set address value described in the variably set address description area of the communication data and also updates their own address write enable/ disable states stored in the state storing means to their write disable states. Then, the communication data transmitting means executes predetermined calculations for the variably set address value described in the variably set address description area of the communication data, then describes the variably set address value calculated by the calculations in the variably set address description area of the communication data, and then transmits the communication data whose variably set address value has been rewritten to succeeding stations.

In this fashion, according to the present invention, like the above invention, their own addresses can be set to a plurality of communication stations by simple process procedures respectively and also throughput as a whole communication system upon setting the address can be improved. In addition to the above, since the system control means which can manage integratedly their own address allocating/setting processes of the plurality of communication stations respectively is provided as a separate body from the communication stations, common configurations of the plurality of communication stations can be adopted and as a result fabrication cost of the overall communication system can be reduced.

The nature, principle and utility of the invention will become more apparent from the following detailed description when read in conjunction with the accompanying drawings.

BRIEF DESCRIPTION OF THE DRAWINGS

In the accompanying drawings:

FIG. 5 is a flowchart showing process procedures of the address setting method according to the present invention.

DESCRIPTION OF THE PREFERRED EMBODIMENTS

An address setting method and a communication system to which the address setting method is applied according to embodiments of the present invention will be explained in detail with reference to the accompanying drawings hereinafter.

Figure 1:
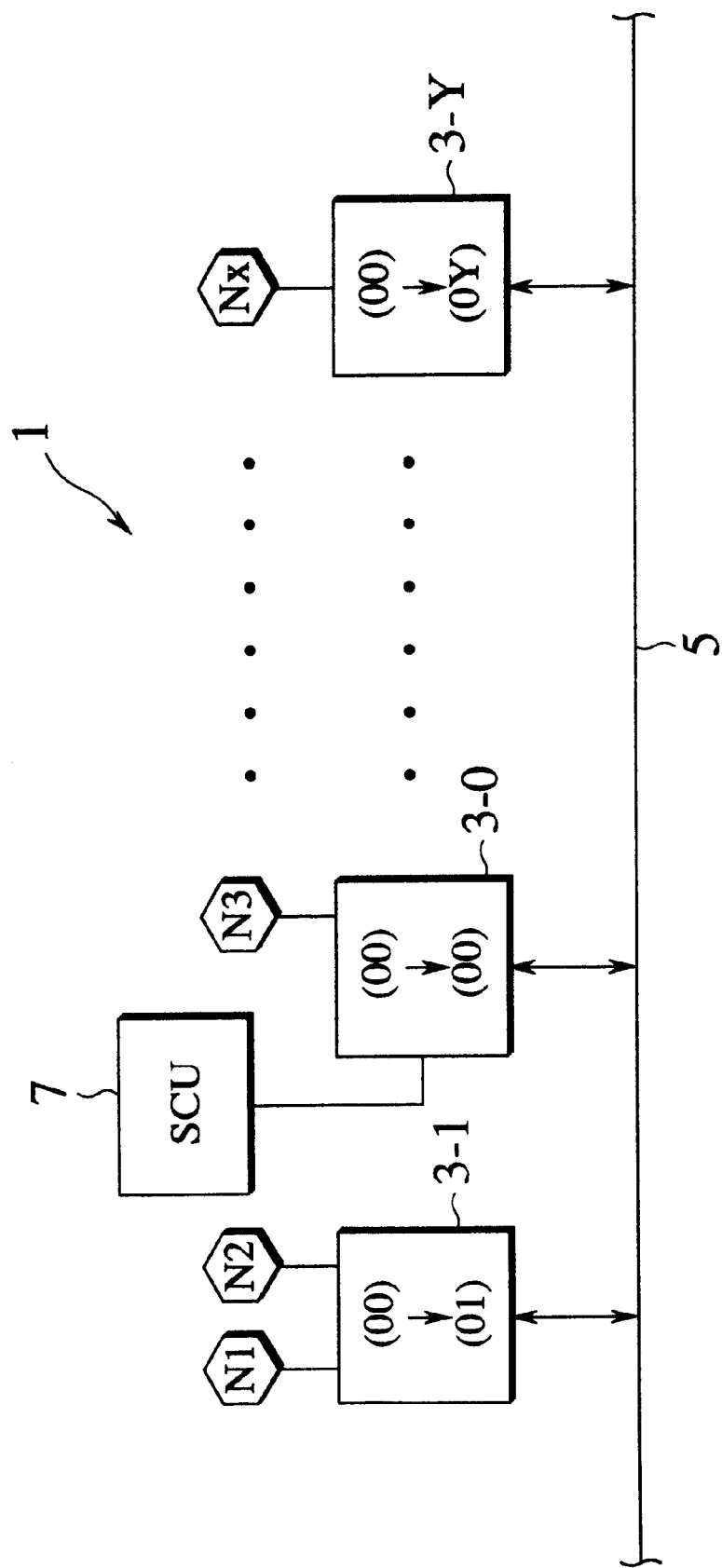
FIG. 1 is a schematic block diagram showing a configuration of a communication system to which an address setting method according to the present invention is applied.

As shown in FIG. 1, a communication system 1 to which an address setting method according to the present invention is applied is constructed by connecting a plurality of communication stations 3-0, 3-1, . . . , 3-Y (where Y is a positive integer) mutually via a bus type data transmission line 5 in a data exchangeable manner. To the communication station 3-0 is connected a system control unit (abbreviated as "SCU" hereinafter) 7 as a system control means which can manage integratedly synchronous control of the overall communication system 1, address setting process for respective communication stations constituting the communication system 1 and respective functional devices N to be described later, etc. As a network topology of the communication system 1, an appropriate topological type, for example, loop type, star type, or the like may be employed other than the above bus type.

One or more than two functional devices N1 to NX (where X is a positive integer) are connected to each of the plurality of communication stations respectively. The communication system 1 is constructed to enable the data exchange between the communication stations, the functional devices N, or the communication station and the functional device N mutually via the data transmission line 5. For example, if the communication system according to the present invention 1 is applied to a vehicle, various functional devices such as a mobile telephone, a facsimile (FAX), a digital TV, a radio receiver, a navigation unit (NV), a DVD (Digital Video Disc or Digital Versatile Disc)-ROM drive, a CD (Compact Disc)-ROM drive, a DAT (Digital Audio Taperecorder), a MD (Mini Disc) drive, an audio amplifier having a built-in digital signal processor, aCAN (ControllerAreaNetwork) interface, various sensors such as an azimuth sensor, a speed sensor etc., a monitor device, a vehicle-equipped personal computer, etc. may be employed appropriately as the functional devices N.

Figure 4:
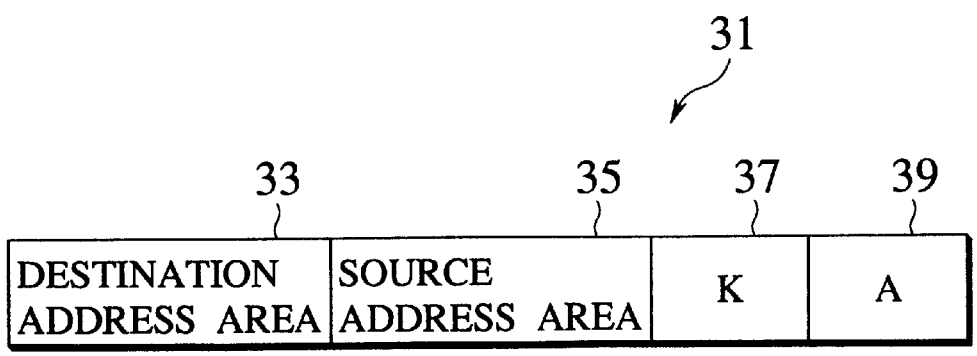
FIG. 4 is a view showing an example of a format of communication data used in the communication system according to the present invention.

A format of communication data which are circulated in the present communication system 1 will be explained with reference to FIG. 4. A plurality of information description areas in which various information are described are set in a signal frame of a communication data 31. The plurality of information description areas are composed of a destination address area 33 in which an address of a destination communication station as a destination of the communication data is described, a source address area 35 in which an address of a source communication station as a source of the communication data is described, a variably set address description area 37 in which an address as a set object for respective communication stations is described as a variably set address K, a set number accumulated value description area 39 in which an accumulated value A of the address setting number carried out repeatedly when any communication failure is caused during the address set process is described, and a data area (not shown) in which various instructions, control information, source data, etc. are described.

Figure 2:
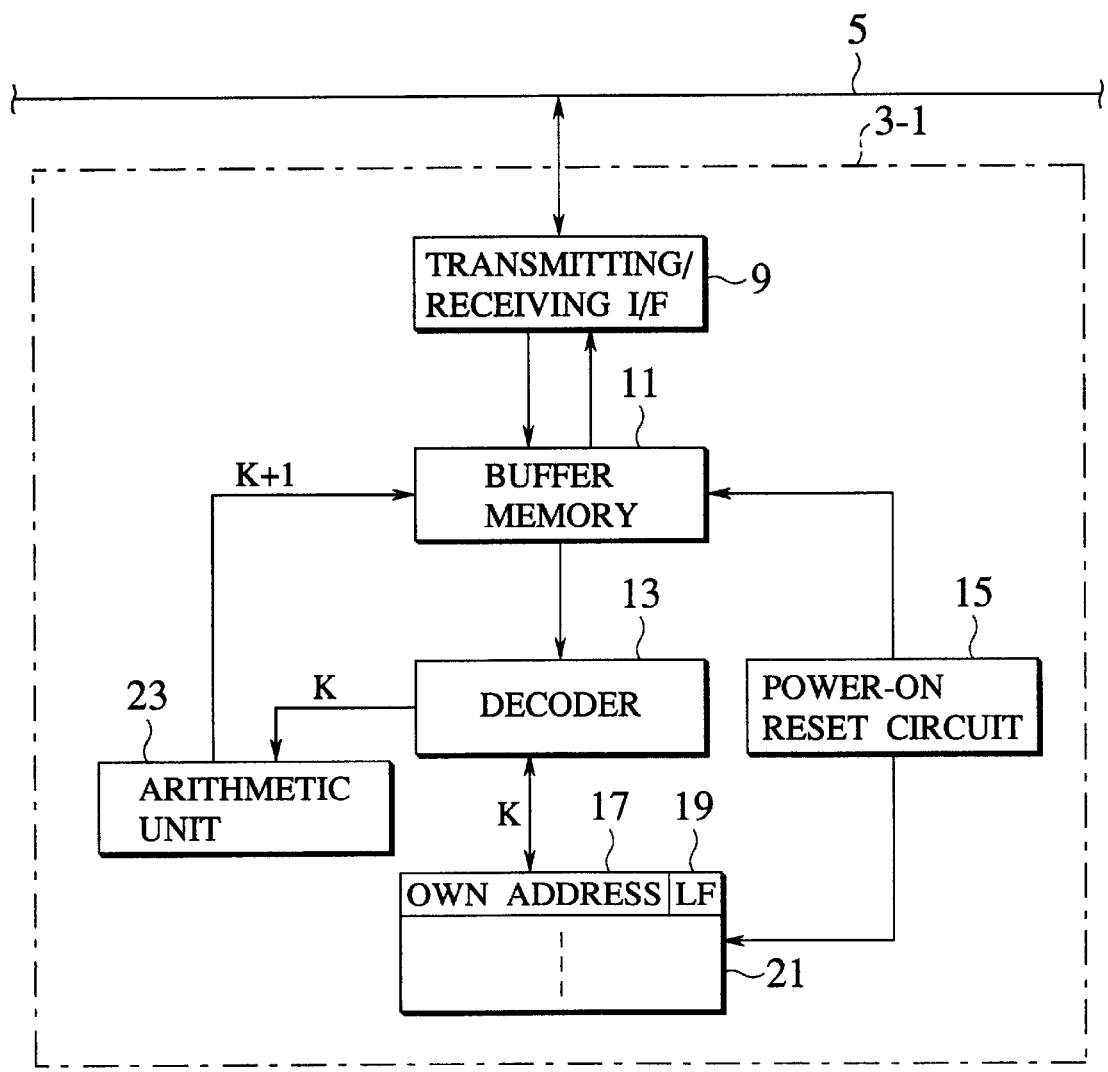
FIG. 2 is a block diagram showing a communication station as a pertinent portion of the communication system according to the present invention.

Next, while taking as an example the case the above formatted communication data are transmitted from the communication station 3-0 acting as the source communication station to a plurality of communication stations 3-1, ..., 3-Y except for the communication station 3-1 with the use of the communication station 3-1 as a representative communication station, a block configuration of each communication station executing major functions in the present communication system 1 will be explained with reference to FIG. 2 hereinbelow.

As shown in FIG. 2, the communication station 3-1 comprises a transmitting/receiving interface (referred to as a transmitting/receiving I/F hereinafter) 9, a buffer memory 11, a decoder 13, a power-on reset circuit 15, an address/flag memory 21 including an address storing area 17 and a lock flag (LF) storing area 19, and an arithmetic unit 23.

The transmitting/receiving I/F 9 receives the communication data which are sent out via the bus type data transmission line 5, while transmitting the communication data whose variably set address K out of various information has been selectively updated in its own station to a succeeding communication station via the data transmission line 5.

The buffer memory 11 stores temporarily the communication data which have been received by the transmitting/receiving I/F 9.

The address/flag memory 21 is composed of RAM, etc., and has the address storing area 17 for storing its own address of the communication station 3-1 per se, and the lock flag (LF) storing area 19 for storing a write enable/disable state for its own address.

The power-on reset circuit 15 generates a reset signal which can initialize stored contents of the buffer memory 11 and the address/flag memory 21 into predetermined values respectively when a power supply of the present communication system 1 is turned on.

The decoder 13 decodes various information including the destination communication address which has been described in the destination address area 33 in the communication data 31 read out from the buffer memory 11, and then decides whether or not the decoded destination address coincides with its own address of the communication station 3-1 stored in the address/flag memory 21. As a result of this coincidences decision, if the destination address coincide with its own address, the decoder 13 then decides a state of the lock flag (LF) which is read out from the lock flag (LF) storing area 19 of the address/flag memory 21. As a result of this state decision, if the lock flag (LF) is in an address write enable state (LF=0), the decoder 13 then decodes the variably set address K in the communication data 31 as its own address and then stores the address K in the address storing area 17 of the address/flag memory 21.

The arithmetic unit 23 calculates K+1 by incrementing the variably set address K sent out from the decoder 13 by one to update, and then sends out the updated value K+1 to the buffer memory 11.

Figure 3:
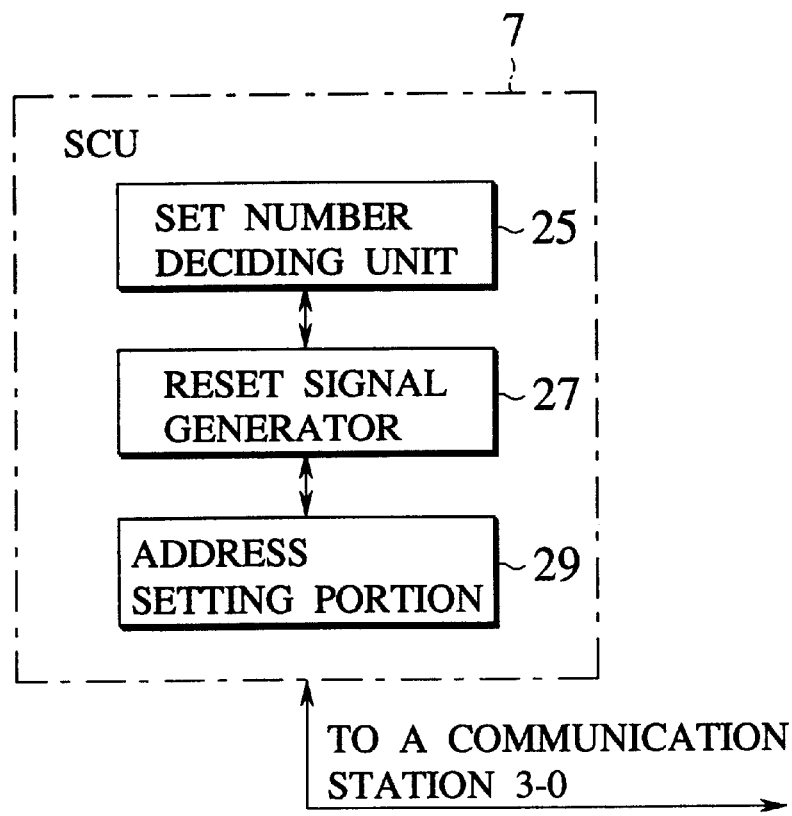
FIG. 3 is a block diagram showing a configuration of a system control unit (SCU) constituting a part of the communication system according to the present invention.

In turn, a block configuration of the SCU 7 connected to the source communication station 3-0 will be explained with reference to FIG. 3 hereinbelow. The SCU 7 comprises a set number deciding unit 25, a reset signal generator 27, and an address setting portion 29.

The set number deciding unit 25 has an initializing function of initializing the accumulated value A of the address set number to "0" as an initial value, an accumulated value storing function of incrementing the set number accumulated value A by one every time the address set process is carried out and then storing the updated set number accumulated value A in an accumulated value storing portion (not shown), and a set number deciding function of deciding based on the set number accumulated value A stored in the accumulated value storing portion whether or not the address set process at this time is effected for the first time and also deciding whether or not the updated set number accumulated value A has come up to a re-set upper limit which is set to an appropriate value, e.g., "3", or so.

The reset signal generator 27 generates a reset signal when the power supply of the communication system 1 is turned on or when it has been decided by the set number deciding unit 25 that the address set process at this time is not effected for the first time, i.e., such address set process is a re-set process.

The address setting portion 29 sets the destination address, the source address and the variably set address K to predetermined values respectively when the address set process is commenced, and also sends out the communication data including various address information, the set number accumulated value A, and address set commands to the communication station 3-0.

Next, referring to as an example the case the communication data are transmitted from the communication station 3-0 acting as the source communication station to the plurality of destination communication stations 3-1, ..., 3-Y except for the communication station 3-0, process procedures in the address setting method which is applied to the present communication system 1 will be explained with reference to FIG. 5 hereinbelow.

At first, when the power supply of the communication system 1 is turned on, the power-on reset circuits 15 in the communication stations 3 generate the reset signals respectively. Based on respective reset signals, stored contents in the buffer memories 11 and the address/flag memories 21 are initialized to predetermined values respectively (step S1). More particularly, according to this initialization process, in respective communication stations 3, the stored contents in the buffer memories 11 are cleared, and their own addresses of respective stations stored in the own address storing area 17 of the address/flag memory 21 are set to a predetermined address, e.g., "00", etc. which is common to all communication stations 3, and a write enable/disable state of their own address stored in the lock flag (LF) storing area 19 is initialized to a write enable state (LF=0).

Then, the set number deciding unit 25 of the SCU 7 connected to the source communication station 3-0 initializes the set number accumulated value A to "0" (step S2). After this initialization, the set number deciding unit 25 increments the set number accumulated value A by one and then stores the updated set number accumulated value A in the accumulated value storing portion (step S3). Then, the set number deciding unit 25 of the SCU 7 decides whether or not the set number accumulated value A stored in the accumulated value storing portion is "1" (step S4). As a result of this decision, if it has been decided that the set number accumulated value A is "1", the address setting portion 29 sets "00" as the destination address described in the destination address area 33, the source address described in the source address area 35, and the variably set address K described in variably set address description area 37 respectively (step S5). Then, the SCU 7 sends out the communication data including various address information, the set number accumulated value A described in the set number accumulated value description area 39, and address set commands to the communication station 3-0 (step S6). The processes in above steps S2 to S6 are executed sequentially on the SCU 7 side.

Meanwhile, a flow of the process in respective communication stations 3 will be explained hereunder. When the transmitting/receiving I/Fs 9 in respective communication stations 3 receive the communication data which are sent out from the SCU 7 during a standby state to receive the communication data or which are sent out from one of the destination communication stations except for the source communication station 3-0, they store the received communication data in the buffer memory 11. At that time, the decoder 13 decodes various information including the destination address, the source address, the variably set address K, and the set number accumulated value A described in the information description areas of the communication data being read out from the buffer memory 11, and also decides whether or not the decoded destination address (00) coincides with an address of its own station stored in the address/flag memory 21. As a result of this coincidence decision, if the destination address coincides with its address, the decoder 13 then decides a state of the lock flag (LF) read out from the lock flag (LF) storing area 19 of the address/flag memory 21 (step S7).

As a result of this state decision in step S7, if the lock flag (LF) of a certain communication station which has received the communication data is in its write enable state (LF=0) of its own address, the decoder 13 then employs the variably set address K described in the communication data as its own address and then stores the address K in the address storing area 17 of the address/flag memory 21 (step S8).

When the own address setting process has been completed in step S8, the decoder 13 sets the lock flag (LF) into its own address write disable state (LF=1) by inverting the state of the lock flag (LF) stored in the lock flag (LF) storing area 19 of the address/flag memory 21. Also, the arithmetic unit 23 calculates K+1 by incrementing the variably set address K sent out from the decoder 13 by one, then updates the value of the variably set address K into K+1, and then sends out the value K+1 to the buffer memory 11 (step S9). As a result, out of the described contents of the communication data stored in the buffer memory 11, the value of the variably set address K is updated into K+1 and then stored.

If the process in step S9 has been completed, the transmitting/receiving I/F 9 transmits the communication data whose variably set address K of various information has been selectively updated in the station to a succeeding communication station, in which "00" has been temporarily set as the destination address, via the data transmission line 5 (step S10). When the transmission process in step S10 has been completed, a flow of the process returns to step S7 and then following processes are executed repeatedly.

In contrast, as a result of the state decision in step S7, if the lock flag (LF) of the communication station which has received the communication data is in an address write disable state (LF=1), i.e., if an address of its own station has already been set, the decoder 13 decides whether or not its own address stored in the address/flag memory 21 coincides with the destination address (00) described in the communication data (step S11). As a result of this coincidence decision in step S11, if its address and the source address coincide with each other, i.e., if the address of the communication station in which "00" is set as its own address has already been set and also the station is the source station, the decoder 13 can recognize the effect that the address setting process has been normally completed. Then, in answer to the effect, the transmitting/receiving I/F 9 transmits to the SCU 7 the normally set complete signal including the effect that the address setting process has been normally completed. Then, when the SCU 7 has received the normally set complete signal, it terminates all address setting processes.

As a result of coincidence decision in step S11, if its own address does not coincide with the source address, i.e., if the address of its its station in which "00" is set as own address has already been set and own station is not the source station, the decoder 13 recognizes the effect that an address failure such that own address of its own station has erroneously been set, etc. has been generated. In response to this, the transmitting/receiving I/F 9 then transmits the abnormally set generating signal including the effect that address set failure occurs to the SCU 7 via the data transmission line 5 and the source communication station 3-0. Then, the SCU 7, which has received the abnormally set generating signal, executes sequentially the address re-set process to be described later in the following steps S3.

More particularly, the set number deciding unit 25 of the SCU 7 increments the set number accumulated value A stored in the accumulated value storing portion by one and then stores the updated set number accumulated value A in the accumulated value storing portion (step S3). Then, the set number deciding unit 25 of the SCU 7 decides whether or not the set number accumulated value A stored in the accumulated value storing portion is "1" (step S4). As a result of this decision, if it has not been decided that the set number accumulated value A is "1", i.e., if any address set abnormality has occurred in the past, the set number deciding unit 25 then decides whether or not the set number accumulated value A is less than or equal to 2 or is more than or equal to 3 (step S12).

As a result of this decision in step S12, if the set number accumulated value A is less than or equal to 2, the reset signal generator 27 of the SCU 7 then generates the reset signal. Based on the reset signal, the stored contents in the buffer memories 11 are cleared, and the addresses of the station stored in their own address storing areas 17 of the address/flag memories 21 are set to a predetermined address, e.g., "00", etc. which is common to all communication stations 3, and then the write enable/disable states of the addresses stored in the lock flag (LF) storing areas 19 are initialized to the write enable state (LF=0) (step S13). After the initialization in step S13, the processes in step S5 and forth are executed sequentially.

In contrast, as a result of the decision in step S12, if the set number accumulated value A is more than or equal to 3, the reset signal generator 27 of the SCU 7 then recognizes the effect that the set number accumulated value A has reached the re-set upper limit value. Then, abnormal termination of the address set process is performed (step S14).

In this way, according to the address setting method according to the present invention, the communication station whose own address coincides with the destination address of the communication data received via the data transmission line and whose write enable/disable state of the address stored in a state storing means is in its write enable state can update its own address to the variably set address value described in the variably set address description area of the communication data, then update its write enable/disable state of its own address to the write disable state, then execute predetermined calculations for the variably set address value described in the variably set address description area of the communication data, then describe the variably set address value calculated by this calculation in the variably set address description area of the communication data, and then transmit the communication data whose variably set address value has been rewritten to the next station so as to circulate between the plurality of communication stations sequentially. Therefore, their own addresses can be set to a plurality of communication stations by simple process procedures respectively and also throughput as a whole communication system upon setting the address can be improved.

The present invention is not limited to the example in the above embodiments and also may be implemented as appropriately modified embodiments within the claims.

In other words, for instance, in the present embodiment, the case has been illustrated where the SCU which can manage integratedly the own address allocation/set process for the plurality of communication stations respectively is connected to any one communication station. However, the present invention is not limited to this embodiment only and the communication system according to the present invention can be constructed by installing the address setting/managing function, which is carried out by the SCU, as any one of functions of the communication station.

Furthermore, if the communication system is constructed such that a total number of the communication stations can be registered previously in the SCU, and then the SCU can collate the total number of the registered communication stations with the variably set address value described in the variably set address description area in the communication data being returned to the own station when the communication data have returned the original SCU after they have circulated in the communication system, it can be easily checked whether or not their own addresses have been allocated/set without omission to all communication stations.

Finally, if the communication system is constructed such that the SCU can retrieve the communication station whose write enable/disable state of own address stored in a state storing means is its write enable state, the number of the communication stations in which their own addresses are not set yet can be grasped.

What is claimed is:

1. An address setting method for a communication system including a plurality of communication stations mutually connected via data transmission lines in a data exchangeable manner, said plurality of communication stations setting their own addresses by sequentially circulating communication data between the plurality of communication stations so as to enable mutual discrimination of their identity, the method comprising:

initializing addresses respectively stored in address memories provided in the plurality of communication stations to a predetermined value common to the plurality of communication stations, and initializing address write enable/disable states respectively stored in enable/disable state memories provided in the plurality of communication stations to write enable states, when an address setting process for each of the plurality of communication stations is started;

transmitting the communication data by any one of the plurality of communication stations to another communication station, said transmitted communication data having the predetermined value common to the plurality of communication stations described in a destination address field corresponding to a destination address of the another communication station, and having an initial value described in a variably set address field corresponding to a variably set address to be set on the another communication station, and updating an address stored in an address memory of the another communication station to be the variably set address described in the variably set address field, updating an address write enable/disable state of the another communication station to be a write disable state executing predetermined calculations to calculate a new variably set address, updating the variably set address field with the new variably set address calculated by the predetermined calculations, and transmitting the communication data including the new variably set address to succeeding communication stations, when the address of the another communication station coincides with the destination address of the communication data received via the data transmission line and a write enable/disable state stored in the enable/disable state memory is in a write enable state.

2. An address setting method for a communication system including a plurality of communication stations mutually connected via data transmission lines in a data exchangeable manner said plurality of communication stations setting their own addresses by sequentially circulating communication data between the plurality of communication stations so as to enable mutual discrimination of their identity, the method comprising:

initializing addresses respectively stored in address memories provided in the plurality of communication stations to a predetermined value common to the plurality of communication stations, and initializing address write enable/disable states respectively stored in enable/disable state memories provided in the plurality of communication stations to write enable states, when an address setting process for each of the plurality of communication stations is started;

transmitting the communication data by a system control unit connected to any one of the plurality of communication stations to a respective communication station of the plurality of communication stations, and transmitted communication data having the predetermined value common to the plurality of communication stations described in a destination address field corresponding to a destination address of the respective communication station, and having an initial value described in a variably set address field corresponding to a variably set address to be set on the respective communication station; and updating an address stored in an address memory of the respective communication station to be the variably set address described in the variably set address field, updating an address write enable/disable state of the respective communication station to be a write disable state executing predetermined calculations to calculate a new variably set address, updating the variably set address field with the new variably set address calculated by the predetermined calculations and transmitting the communication data including the new variably set address to succeeding communication stations when the address of the respective communication coincides with the destination address of the communication data received via the data transmission line and a write enable/disable state stored in the enable/disable state memory is in a write enable state, wherein the system control unit integratedly manages address setting processes of the plurality of communication stations.

3. An address setting method according to claim 2, wherein the respective communication station decides whether or not their address coincides with a source address included in the communication data, when their own address coincides with the destination address of received communication data and their write enable/disable state stored in the enable/disable state memory is in the write enable state, and wherein the respective communication station determines the address setting process has normally completed and transmits a normally set complete signal indicating the address setting process has normally completed to the system control unit when the address of the respective communication station coincides with the source address included in the communication data.

4. An address setting method according to claim 3, wherein the system control unit terminates the address setting processes of the plurality of communication stations upon receiving the normally set complete signal.

5. An address setting method according to claim 2, wherein the respective communication station decides whether or not their address coincides with a source address included in the communication data, when their own address coincides with the destination address of received communication data and their write enable/disable state stored in the enable/disable state memory is in the write disable state, and wherein the respective communication station determines the address setting process has failed and transmits a set failure generation signal indicating the address setting process has failed to the system control unit when the address of the respective communication station does not coincide with the source address included in the communication data.

6. An address setting method according to claim 5, wherein the system control unit repeatedly executes the address setting processes of the plurality of communication stations respectively upon receiving the set failure generation signal.

7. An address setting method according to claim 6, wherein the system control unit executes abnormal termination of the address setting processes when a repeatedly execution number of the address setting processes reaches a predetermined value.

8. A communication system including a plurality of communication stations mutually connected via data transmission lines in a data exchangeable manner and in which addresses of the plurality of communication stations are respectively set by sequentially circulating communication data between the plurality of communication stations so as to enable mutual discrimination of their identity, wherein the communication data comprises:

a destination address area in which a destination communication station address is described, and a variably set address field in which a variably set address to be set on a respective communication station of the plurality of communication stations is described, wherein each of the plurality of communication stations comprises;

an address storing means for storing its own communication station address;

a state storing means for storing a write enable/disable state corresponding to its own communication station address; and an initializing means for initializing its own communication station address stored in the address storing means to a predetermined value common to the plurality of communication stations, and for initializing the write enable/disable state stored in the state storing means to a write enable state, when a respective address setting process for the plurality of communication stations is started, wherein any one of the plurality of communication stations comprises:

an initial data transmitting means for transmitting the communication data to another communication station, said communication data having the predetermined value common to the plurality of communication stations described in the destination address area and having an initial value described in the variably set address field corresponding to a variably set address to be set on the another communication station, and wherein each of the plurality of communication stations including the any one of the plurality of communication stations comprises;

a communication data receiving means for receiving the communication data via the data transmission line;

an updating means for updating their own communication station address stored in the address storing means to the variably set address value described in the variably set address field of the communication data, and for updating their own address write enable/disable state stored in the state storing means to a write disable state, when their own address coincides with the destination address of the communication data received via the data transmission line and their write enable/disable state is in a write enable state; and a communication data transmitting means for executing predetermined calculations for calculating a new variably set address value for setting the new variably set address value calculated by the predetermined calculations in the variably set address field of the communication data, and for transmitting the communication data whose variably set address value has been rewritten to succeeding stations.

9. A communication system including a plurality of communication stations mutually connected via data transmission lines in a data exchangeable manner and in which addresses of the plurality of communication stations are respectively set by sequentially circulating communication data between the plurality of communication stations so as to enable mutual discrimination of their identity, wherein the communication data comprises;

a destination address area in which a destination communication station address is described, and a variably set address field in which a variably set address to be set on a respective communication station of the plurality of communication stations is described, and wherein each of the plurality of communication stations comprises;

an address storing means for storing its own communication station address;

a state storing means for storing a write enable/disable state corresponding to its own communication station address and an initializing means for initializing its own communication station address stored in the address storing means to a predetermined value common to the plurality of communication stations, and for initializing the write enable/disable state stored in the state storing means to a write enable state, when a respective address setting process for the plurality of communication stations is started, wherein a system control means, which is connected to any one of the plurality of communication stations and which integratedly manages address setting processes of the plurality of communication stations, comprises;

an initial data transmitting means for transmitting the communication data to a respective communication station of the plurality of communication systems, said transmitted communication data having the predetermined value common to the plurality of communication stations described in a destination address field corresponding to a destination address of the respective communication station and having an initial value described in a variably set address field corresponding to a variably set address to be set to the respective communication station, and wherein each of the plurality of communication stations including the any one of the plurality of communication stations comprises;

a communication data receiving means for receiving the communication data via the data transmission line;

an updating means for updating their own communication station address stored in the address storing means to the variably set address value described in the variably set address field of the communication data, for updating their own address write enable/disable state stored in a state storing means to a write disable state, when their own address coincides with the destination address of the communication data received via the data transmission line and their write enable/disable state is in a write enable state; and a communication data transmitting means for executing predetermined calculations for calculating a new variably set address, for setting the new variably set address value calculated by the predetermined calculations in the variably set address field of the communication data, and for transmitting the communication data whose variably set address value has been rewritten to succeeding stations.

10. A communication system including a plurality of communication stations mutually connected via data transmission lines in a data exchangeable manner and in which addresses of the plurality of communication stations are respectively set by sequentially circulating communication data between the plurality of communication stations so as to enable mutual discrimination of their identity, wherein the communication data comprises:

a destination address area in which a destination communication station address is described; and a variably set address field in which a variably set address to be set on a respective communication station of the plurality of communication stations is described, wherein each of the plurality of communication stations comprises;

an address memory configured to store its own communication station address;

a state memory configured to store a write enable/disable state corresponding to its own communication station address; and an initializing mechanism configured to initialize its own communication station address stored in the address memory to a predetermined value common to the plurality of communication stations, and configured to initialize the write enable/disable state stored in the state memory to a write enable state, when a respective address setting process for the plurality of communication stations is started, wherein any one of the plurality of communication stations comprises:

an initial data transmitting mechanism configured to transmit the communication data to another communication station, said communication data having the predetermined value common to the plurality of communication stations described in the destination address area and having an initial value described in the variably set address field corresponding to a variably set address to be set on the another communication station, and wherein each of the plurality of communication stations including the any one of the plurality of communication stations comprises;

a communication data receiver configured to receive the communication data via the data transmission line;

an updating mechanism configured to update their own communication station address stored in the address memory to the variably set address value described in the variably set address field of the communication data, to update their own address write enable/disable state stored in the state memory to a write disable state, when their own address coincides with the destination address of the communication data received via the data transmission line and their write enable/disable state is in a write enable state; and a communication data transmitter configured to execute predetermined calculations for calculating a new variably set address value, to set the new variably set address value calculated by the predetermined calculations in the variably set address field of the communication data, and to transmit the communication data whose variably set address value has been rewritten to succeeding stations.

11. A communication system including a plurality of communication stations mutually connected via data transmission lines in a data exchangeable manner and in which addresses of the plurality of communication stations are respectively set by sequentially circulating communication data between the plurality of communication stations so as to enable mutual discrimination of their identity, wherein the communication data comprises:

a destination address area in which a destination communication station address is described; and a variably set address field in which a variably set address to be set on a respective communication station of the plurality of communication stations is described, and wherein each of the plurality of communication stations comprises:

an address memory configured to store its own communication station address;

a state memory configured to store a write enable/disable state corresponding to its own communication station address and an initializing mechanism configured to initialize its own communication station stored in the address memory to a predetermined value common to the plurality of communication stations, and to initialize the write enable/disable state stored in the state memory to a write enable state, when a respective address setting process for the plurality of communication stations is started, wherein a system control unit, which is connected to any one of the plurality of communication stations and which integratedly manages address setting processes of the plurality of communication stations, comprises:

an initial data transmitting mechanism configured to transmit the communication data to a respective communication station of the plurality of communication systems, said transmitted communication data having the predetermined value common to the plurality of communication stations described in a destination address field corresponding to a destination address of the respective communication station, and having an initial value described in a variably set address field corresponding to a variably set address to be set to the respective communication station, and wherein each of the plurality of communication stations including the any one of the plurality of communication stations comprises:

a communication data receiver configured to receive the communication data via the data transmission line;

an updating mechanism configured to update their own communication station address stored in the address memory to the variably set address value described in the variably set address field of the communication data, and to update their own address write enable/disable state stored in a state memory to a write disable state, when their own address coincides with the destination address of the communication data received via the data transmission line and their write enable/disable state is in a write enable state; and a communication data transmitter configured to execute predetermined calculations for calculating a new variably set address, to set the new variably set address value calculated by the predetermined calculations in the variably set address field of the communication data, and to transmit the communication data whose variably set address value has been rewritten to succeeding stations.

* * * * *

UNITED STATES PATENT AND TRADEMARK OFFICE
CERTIFICATE OF CORRECTION

PATENT NO. : 6,167,454
DATED : December 26, 2000
INVENTOR(S) : Yoshinori Nakatsugawa It is certified that error appears in the above-identified patent and that said Letters Patent is hereby corrected as shown below:

Column 10, line 66, change "aCAN" to --a CAN--.
Column 11, line 67, in the first occurrence, change "coincidences" to --coincidence--;
    same line in the second occurrence, change "coincide" to --coincides--.
Column 14, line 27, change "own" to --its--;
    line 28, change "own" to --the--;
    line 30, in the first occurrence change "own" to --the--.
Column 16, line 57, change "and" to --said--.
Column 18, line 2, change "," to --;--;
    line 64, change "," to --;--.
Column 19, line 2, change ";" to --:--;
    line 19, change ";" to --:--;
    line 34, change ";" to --:--.

Signed and Sealed this

Eighth Day of May, 2001

*Attest:*

NICHOLAS P. GODICI

*Attesting Officer*  *Acting Director of the United States Patent and Trademark Office*